(12) United States Patent
Ricatto et al.

(10) Patent No.: US 7,029,636 B2
(45) Date of Patent: Apr. 18, 2006

(54) ELECTRODE DISCHARGE, NON-THERMAL PLASMA DEVICE (REACTOR) FOR THE PRE-TREATMENT OF COMBUSTION AIR

(75) Inventors: Pascal J. Ricatto, Ridgewood, NJ (US); Edward J. Houston, East Brunswick, NJ (US); Richard Crowe, Hazlet, NJ (US)

(73) Assignee: Plasmasol Corporation, Hoboken, NJ (US)

( * ) Notice: Subject to any disclaimer, the term of this patent is extended or adjusted under 35 U.S.C. 154(b) by 544 days.

(21) Appl. No.: 10/211,936

(22) Filed: Aug. 2, 2002

(65) Prior Publication Data
US 2003/0031610 A1 Feb. 13, 2003

Related U.S. Application Data

(63) Continuation-in-part of application No. 09/738,923, filed on Dec. 15, 2000, now Pat. No. 6,818,193.

(60) Provisional application No. 60/358,340, filed on Feb. 19, 2002, provisional application No. 60/309,502, filed on Aug. 2, 2001, provisional application No. 60/171,324, filed on Dec. 21, 1999, provisional application No. 60/171,198, filed on Dec. 15, 1999.

(51) Int. Cl.
*B01J 19/08* (2006.01)
(52) U.S. Cl. .............. 422/186.04; 204/177; 60/275
(58) Field of Classification Search ........... 422/186.04; 20/177; 60/275
See application file for complete search history.

(56) References Cited

U.S. PATENT DOCUMENTS

| | | | |
|---|---|---|---|
| 3,594,065 A | 7/1971 | Marks | |
| 3,948,601 A | 4/1976 | Fraser et al. | |
| 4,147,522 A | 4/1979 | Gonas et al. | |
| 4,357,151 A | 11/1982 | Helfritch et al. | |
| 4,643,876 A | 2/1987 | Jacobs et al. | |
| 4,698,551 A | 10/1987 | Hoag | 313/619 |
| 4,756,882 A | 7/1988 | Jacobs et al. | |
| 4,818,488 A | 4/1989 | Jacob | |
| 4,885,074 A | 12/1989 | Susko et al. | 204/298 |
| 4,898,715 A | 2/1990 | Jacob | |
| 4,931,261 A | 6/1990 | Jacob | |

(Continued)

FOREIGN PATENT DOCUMENTS

EP 1 084 713 A1 3/2001

(Continued)

OTHER PUBLICATIONS

International Search Report.

(Continued)

*Primary Examiner*—Kishor Mayekar
(74) *Attorney, Agent, or Firm*—Darby & Darby

(57) ABSTRACT

A device for the pre-treatment of combustion air by exposure to non-thermal plasma at substantially atmospheric pressure and a method for operating the same. The device includes an inner electrode having a longitudinal channel defined therein to receive a fuel. An outer dielectric layer is separated a predetermined distance from the inner electrode so as to form a non-thermal atmospheric pressure plasma region therebetween for receiving the combustion air to be treated. The outer dielectric has at least one opening (e.g., capillaries or slots) defined therethrough from which the non-thermal plasma is emitted. At least one outer electrode (e.g., in the shape of a pin or ring) is disposed in fluid communication with the at least one opening. The treated combustion air and fuel are combined in a mixing region. The pretreatment device may be disposed in an unsealed or a sealed combustion burner.

42 Claims, 6 Drawing Sheets

U.S. PATENT DOCUMENTS

| | | | |
|---|---|---|---|
| 5,033,355 A | 7/1991 | Goldstein et al. ............... 89/8 |
| 5,062,708 A | 11/1991 | Liang et al. ............... 356/316 |
| 5,084,239 A | 1/1992 | Moulton et al. |
| 5,115,166 A | 5/1992 | Campbell et al. |
| 5,178,829 A | 1/1993 | Moulton et al. |
| 5,184,046 A | 2/1993 | Campbell |
| 5,186,893 A | 2/1993 | Moulton et al. |
| 5,288,460 A | 2/1994 | Caputo et al. |
| 5,325,020 A | 6/1994 | Campbell et al. |
| 5,376,332 A | 12/1994 | Martens et al. |
| 5,387,842 A | 2/1995 | Roth et al. |
| 5,408,160 A | 4/1995 | Fox |
| 5,413,758 A | 5/1995 | Caputo et al. |
| 5,413,759 A | 5/1995 | Campbell et al. |
| 5,413,760 A | 5/1995 | Campbell et al. |
| 5,414,324 A | 5/1995 | Roth et al. |
| 5,451,368 A | 9/1995 | Jacob |
| 5,472,664 A | 12/1995 | Campbell et al. |
| 5,476,501 A | 12/1995 | Stewart et al. ............... 607/127 |
| 5,482,684 A | 1/1996 | Martens et al. |
| 5,498,526 A | 3/1996 | Caputo et al. |
| 5,549,735 A | 8/1996 | Coppom |
| 5,593,476 A | 1/1997 | Coppom |
| 5,593,550 A | 1/1997 | Stewart et al. ............... 204/164 |
| 5,593,649 A | 1/1997 | Fisher et al. |
| 5,594,446 A | 1/1997 | Vidmar et al. ............... 342/1 |
| 5,603,895 A | 2/1997 | Martens et al. |
| 5,637,198 A | 6/1997 | Breault |
| 5,645,796 A | 7/1997 | Caputo et al. |
| 5,650,693 A | 7/1997 | Campbell et al. |
| 5,667,753 A | 9/1997 | Jacobs et al. |
| 5,669,583 A | 9/1997 | Roth |
| 5,686,789 A | 11/1997 | Schoenbach et al. |
| 5,695,619 A | 12/1997 | Williamson et al. |
| 5,733,360 A | 3/1998 | Feldman et al. |
| 5,753,196 A | 5/1998 | Martens et al. |
| 5,822,981 A * | 10/1998 | Williamson et al. ............ 60/275 |
| 5,872,426 A | 2/1999 | Kunhardt et al. |
| 5,939,829 A | 8/1999 | Schoenbach et al. |
| 6,005,349 A | 12/1999 | Kunhardt et al. |
| 6,007,742 A | 12/1999 | Czernichowski et al. |
| 6,016,027 A | 1/2000 | De Temple et al. |
| 6,027,616 A | 2/2000 | Babko-Malyi ............... 204/164 |
| 6,055,349 A | 4/2000 | Seino et al. ............... 315/111.21 |
| 6,113,851 A | 9/2000 | Soloshenko et al. |
| 6,146,724 A | 11/2000 | Roth |
| 6,147,452 A | 11/2000 | Kunhardt et al. ............... 313/582 |
| 6,170,668 B1 | 1/2001 | Babko-Malyi ............... 209/127.1 |
| 6,228,330 B1 | 5/2001 | Herrmann et al. |
| 6,232,723 B1 | 5/2001 | Alexeff |
| 6,245,126 B1 | 6/2001 | Feldman et al. ............... 95/59 |
| 6,245,132 B1 | 6/2001 | Feldman et al. ............... 96/28 |
| 6,255,777 B1 | 7/2001 | Kim et al. |
| 6,322,757 B1 | 11/2001 | Cohn et al. ............... 422/186.04 |
| 6,325,972 B1 | 12/2001 | Jacobs et al. |
| 6,333,002 B1 | 12/2001 | Jacobs et al. |
| 6,365,102 B1 | 4/2002 | Wu et al. |
| 6,365,112 B1 | 4/2002 | Babko-Malyi et al. |
| 6,372,192 B1 | 4/2002 | Paulauskas et al. ...... 423/447.1 |
| 6,375,832 B1 | 4/2002 | Eliasson et al. ............ 208/141 |
| 6,383,345 B1 | 5/2002 | Kim et al. |
| 6,395,197 B1 | 5/2002 | Detering et al. ............. 252/373 |
| 6,399,159 B1 | 6/2002 | Grace et al. ............... 427/536 |
| 6,433,480 B1 | 8/2002 | Stark et al. |
| 6,451,254 B1 | 9/2002 | Wang et al. |
| 6,458,321 B1 | 10/2002 | Platt, Jr. et al. |
| 6,475,049 B1 | 11/2002 | Kim et al. |
| 6,497,839 B1 | 12/2002 | Kasegawa et al. |
| 6,509,689 B1 | 1/2003 | Kim et al. |
| 6,545,411 B1 | 4/2003 | Kim et al. |
| 6,548,957 B1 | 4/2003 | Kim et al. |
| 6,570,172 B1 | 5/2003 | Kim et al. |
| 6,580,217 B1 | 6/2003 | Kim et al. |
| 6,599,471 B1 | 7/2003 | Jacobs et al. |
| 6,627,150 B1 | 9/2003 | Wang et al. |
| 6,632,323 B1 | 10/2003 | Kim et al. |
| 6,635,153 B1 | 10/2003 | Whitehead |
| 6,673,522 B1 | 1/2004 | Kim et al. |
| 6,685,523 B1 | 2/2004 | Kim et al. |
| 6,818,193 B1 | 11/2004 | Christodoulatos et al. |
| 2002/0011203 A1 | 1/2002 | Kim |
| 2002/0011770 A1 | 1/2002 | Kim et al. |
| 2002/0045396 A1 | 4/2002 | Kim |
| 2002/0092616 A1 | 7/2002 | Kim |
| 2002/0105259 A1 | 8/2002 | Kim |
| 2002/0105262 A1 | 8/2002 | Kim |
| 2002/0122896 A1 | 9/2002 | Kim et al. |
| 2002/0124947 A1 | 9/2002 | Kim |
| 2002/0126068 A1 | 9/2002 | Kim et al. |
| 2002/0127942 A1 | 9/2002 | Kim et al. |
| 2002/0139659 A1 | 10/2002 | Yu et al. |
| 2002/0144903 A1 | 10/2002 | Kim et al. |
| 2002/0148816 A1 | 10/2002 | Jung et al. |
| 2002/0187066 A1 | 12/2002 | Yu et al. |
| 2003/0003767 A1 | 1/2003 | Kim et al. |
| 2003/0015505 A1 | 1/2003 | Yu et al. |
| 2003/0035754 A1 | 2/2003 | Sias et al. |
| 2003/0048240 A1 | 3/2003 | Shin et al. |
| 2003/0048241 A1 | 3/2003 | Shin et al. |
| 2003/0062837 A1 | 4/2003 | Shin et al. |
| 2003/0070760 A1 | 4/2003 | Kim et al. |
| 2003/0071571 A1 | 4/2003 | Yu et al. |
| 2003/0085656 A1 | 5/2003 | Kunhardt et al. |
| 2003/0127984 A1 | 7/2003 | Kim et al. |
| 2003/0134506 A1 | 7/2003 | Kim et al. |
| 2003/0141187 A1 | 7/2003 | Sohn et al. |
| 2004/0022673 A1 | 2/2004 | Protic |

FOREIGN PATENT DOCUMENTS

| | | |
|---|---|---|
| EP | 1 378 253 A1 | 1/2004 |
| WO | WO-01/44790 A1 | 6/2001 |
| WO | WO-02/49767 A1 | 6/2002 |

OTHER PUBLICATIONS

Vidmar, R.J., "On the Use of Atmospheric Pressure Plasma as Electromagnetic Reflectors and Absorbers", *IEEE Transactions on Plasma Science*, vol. 18 No. 4, Aug. 1990.

Kundhart, E.E., "Generation of Large-Volume, Atmosphereic-Pressure, Nonequilibrium Plasmas", *IEEE Transactions on Plasma Science*, vol. 28, No. 1, pp. 189-200, Feb. 2000.

Penetrante et al., "Non-Thermal Plasma Techniques for Abatement of Violatile Organic Compounds and Nitrogen Oxides", *INP Report XIII*, pp. 18-46 (1996).

Chen D.C.C., Lawton, J., and Weinberg, F.K., *Tenth Symposium on Combustion*, pp. 743-754 (1965).

Tarnovsky, V. and Becker, K., *Plasma Sources Science and Technology*, vol. 4, No. 307 (1995).

Knight, Henry de Boyne, the Arc Discharge; its application to power control, *London Chapman & Hall* (1960).

L.A. Rosenthal and D.A. Davis, "Electrical Characterizetion of a Corona Discharge for Surface Treatment", *IEEE Transaction on Industry Applications*, vol. 1A-11, No. 3, pp. 328-335 (May/Jun. 1975).

S. Han, Y. Lee, H. Kim, J. Lee, J. Yoon, and G. Kim, "Polymer Surface Modification by Plasma Source Ion Implantation", *Surfaces and Coatings Technology*, vol. 93, pp. 261-264 (1997).

Kolman et al., "Genotoxic effects of ethylene oxide, propylene oxide and epichlorohydrin in humans: update review" (1990-2000), Mutation Research 512 (2002) 173-194.

Schoenbach et al., "Special Issue on Nonthermal Medical/Biological Treatments Using Electromagnetic Fields and Ionized Gasses", IEEE Transactions on Plasma Science, vol. 28, No. 1, Feb. 2000.

Jacobs, "STERRAD 100S" Sterilization System; Advanced Sterilization products a Johnson & Johnson Company, 1999 Advanced Sterilization Products.

Sharpless et al. "Interaction of Organophosphonates with $O(^3P)$, $N(^4S)$, $)2(a^1 g)$, and $O_3$", Non-Thermal Plasma Techniques or Pollution control, Nato ASI Series. vol. G 34,Part A, p. 123-127 (1993).

Paur, "Removal of Volatile Hydrocarbons From Industrial Off-Gas", Non-Thermal Plasma Techniques for Pollution Control, Nato ASI Series, vol. G34 Part B, p. 77-89 (1993).

Mizuno et al. "Application of Corona Technology in the Reduction of Greenhouse gases and Other Gaseous Pollutants", Non-Thermal Plasma Techniques for Pollution Control, Nato ASI Series vol. G34 Part B. 165-185 (1993).

Yamamoto et al., "Decomposition of Valatile Organic Compounds By a Packed-Bed Reactor and a Pulsed-Corona Plasma Reactor", Non-thermal Plasma Techniques for Pollution Control, Nato ASI Series, vol. G34, Part B, p. 223-237 (1993).

Rosocha et al., Treatment of Hazardous Organic Wastes Using Silent Discharge Plasmas, Non-Thermal Plasma Techniques for Pollution Control, Nato ASI Series vol. G34 Part B, p. 281-308 (1993).

Babko-Malyi, Sergei and Nelson, Gordon L., "Experimental Evaluation of Capillary Korona Discharges", American Institute of Aeronautics and Astronautics, 30th Plasmadynamics and Lasers Conference: AIAA-99-3488 (Jun. 28-Jul. 1, 1999), pp. 1-14.

Stark, et al., "Direct Current Glow Discharges in Atmospheric Air", American Institute of Aeronautics and Astronautics, 30th Plasmadynamics and Lasers Conference: AIAA-99-3666 (Jun. 28-Jul. 1, 1999), pp. 1-5.

Babko-Malyi, Sergei, "Ion-drift Reactor Concept", Fuel Processing Technology (1999), pp. 231-246.

Broer, S., Th. Hammer, Romheld, M., "Treatment of Diesel-Engine Exhaust by Silent Discharge Plasma" INP Report XIII (1996).

Christ, Jr., Buckley, "Leak Testing of Tank Linings by High Voltage Discharge", ElectroTechnic Products, Inc. Guide for Using Company's Probes (1993).

Tarnovsky, V., et al., "Electron-impact ionization of atoms, molecules, ions and transient species", Plasma Sources Science and Technology, vol. 4, pp. 307-315 (1995).

Lawton, James, et al., Electrical Aspects of Combustion, Clarendon Press, Oxford (1969).

Becker, Kurt H., et al., "Collisional and radiative processes in high-pressure discharge plasmas", Physics of Plasmas, vol. 9, No. 5, pp. 2399-2404 (May 2002).

Penetrante et al., "Non-Thermal Plasma Techniques for Abatement of Volatile Organic Compoudns and Nitrogen Oxides", INP Report XIII, pp. 18-46 (1996).

Schoenbach, Karl, et al., "Special Issue on Nonthermal Medical/Biological Treatments Using Electromagnetic Fields and Ionized Gases", IEEE Transactions on Plasma Science, vol. 28, No. 1, pp. 2-5 (Feb. 2000).

Sharpless, R.L., "Interaction of Organophosphonates with O(3P), N(4S), OS(A1G), and O3", vol. A, p. 123-137 of NATO ASI Series G, vol. 34, Penetrante, B.M. and Schultheis S.E., ed. (1993).

Han, S., et al., "Polymer Surface Modification by Plasma Source Ion Implantation", Surfaces & Coatings Technology, vol. 93, pp. 261-264 (1997).

Jacobs, Paul T., Sterrad 100S Sterilization System Advanced Sterilization Products literature, p. 1-17 (1999).

Kolman, Ada, et al., "Genotoxic effects of ethylene oxide, poroylene oxide and epichlorohydrin in humans: update review (1990-2001)", Mutation Research 512, pp. 173-194 (2002).

Rosocha, L.A., et al., "Treatment of Hazardous Organic Wasets Using Silent Discharge Plasmas", vol. B, pp. 281-308 of NATO ASI Series G, vol. 34, Penetrante, B.M. and Schultheis S.E., ed (1993).

Rosenthal, L.A., et al., "Electrical Characterization of a Corona Discharge for Surface Treatment", IEEE Transaction on Industry Applications, vol. 1A-11, No. 3, pp. 328-335 (May/Jun. 1975).

Chen, D.C.C., et al., "Augmenting Flames with Electric Discharges", Tenth Symposium on Combustion, pp. 734-754 (1965).

Vidmar, R. J., "On the Use of Atmospheric Pressure Plasmas as Electromagnetic Reflectors and Absorbers", IEEE Transactions on Plasma Science, vol. 18, No. 4, Aug. 1990.

Paur, H.R., "Removal of Volatile Hydrocarbons from Industrial Off-Gas", vol. B, pp. 77-89 of NATO ASI Series G, vol. 34, Penetrante, B.M. and Schultheis S.E., ed. (1993).

Knight, Henry de Boyne, The Arc Discharge; its applications to power control, London Chapman & Hall (1960).

Yamamoto, T., et al., "Decomposition of Volatile Organic Compounds by a Packed-Bed Reactor and a Pulsed-Corona Plasma Reactor", vol. B, pp.. 223-237 of NATO ASI Series G, vol. 34, Penetrante, B.M. and Schultheis S.E., ed. (1993).

Kunhardt, E. E., "Generation of Large-Volume, Atmospheric-Pressure, Nonequilibrium Plasmas", IEEE Transactions on Plasma Science, vol. 28, No. 1, pp. 189-200, Feb. 2000.

Mizuno, A., et al., "Application of Corona Technology in the Reduction of Greenhouse Gases and Other Gaseous Pollutants", vol. B, pp. 165-185 of NATO ASI Series G, vol. 34, Penetrante, B.M. and Schultheis S.E., ed. (1993).

* cited by examiner

ELECTRODE DISCHARGE, NON-THERMAL PLASMA DEVICE (REACTOR) FOR THE PRE-TREATMENT OF COMBUSTION AIR

CROSS-REFERENCE TO RELATED APPLICATIONS

This application is a continuation-in-part of U.S. patent application Ser. No. 09/738,923, filed on Dec. 15, 2000, now U.S. Pat. No. 6,818,193, which is hereby incorporated by reference and claims the benefit of U.S. Provisional Application Nos. 60/171,198, filed on Dec. 15, 1999, and 60/171,324, filed on Dec. 21, 1999; and this application claims the benefit of U.S. Provisional Application Nos. 60/309,502, filed on Aug. 2, 2001, and 60/358,340, filed on Feb. 19, 2002, both of which are hereby incorporated by reference in their entirety.

BACKGROUND OF THE INVENTION

1. Field of the Invention

The present invention is directed to a plasma system and method and, in particular, to an annular electrode discharge, non-thermal plasma device for the pre-treatment of combustion air and method for operating the same.

2. Description of Related Art

Studies investigating the augmentation of flames with plasma date back over several decades. The benefits of pre-treating the air used for combustion are well known, namely flames can burn with a leaner fuel-air mix and at lower temperatures resulting in increased fuel efficiency and reduced emissions.

A combustion process is generally initiated and maintained by heating the bulk gas to a temperature (typically in the order of approximately 1000° C.) where free radicals such as O, OH, H are formed that can initiate dissociation and oxidation reactions. In the case of pure hydrocarbons, complete molecular conversion will result in the formation of carbon dioxide and water which can be released directly to the atmosphere. The chemical efficiency of the molecular conversion depends on the generation and propagation of free radicals, which effectively break carbon bonds. The efficiency of production and the concentration of these radicals depend primarily on the temperature of the combustion gas. To achieve the high temperature that is necessary for such conversion, considerable enthalpy must be added to the gaseous medium. Sufficiently high temperatures can be realized by direct heating, for example, using an incinerator or a thermal electric arc. Recently, it has been shown that an alternative and efficient way to produce radicals and promote combustion may be in electrical discharges that generate non-thermal plasmas, as disclosed in the publication by Penetrante B. M., and Schultheis S. E., entitled "Non-Thermal Plasma Techniques for Pollution Control", *NATO ASI Series G*, Vol. 34, Parts A and B (1992).

Plasma is a term used to denote a region of ionized gases. Plasma can be created by bulk heating of the ambient gas (as in a flame) or by selectively energizing electrons by electrical energy (as in electrical discharges). Non-Thermal Plasmas (NPT) are ionized gases which are far from local thermodynamic equilibrium (LTE) and are characterized by having electron mean energies significantly higher than those of ambient gas molecules. In NTP, it is possible to preferentially direct the electrical energy in order to produce highly energetic electrons with minimal, if any, heating of the ambient gas. Instead, the energy is almost entirely utilized to directly excite, dissociate and ionize the gas via electron impact.

The idea of using an electrical discharge to increase the net enthalpy extracted from chemical combustion and reduce regulated emissions is one that has been investigated for decades, as disclosed by Chen, D. C. C., Lawton, J., and Weinberg, F. J., in the publication *Tenth Symposium on Combustion*, pp. 743–754 (1965). Chen and his colleagues discussed the approaches tried and problems encountered by he and other scientific investigators of his day. The idea was to create the free radical precursors necessary to the combustions process by electrically "heating" the appropriate molecules rather than thermally heating the bulk fuel-air mixture. The problems encountered then, and still remain today, are centered on the following two factors: i) the uniform creation of free radicals, ii) without expending more energy than that extracted from the chemical reaction.

Early attempts to use an arc discharge to enhance the combustion process presented several problems. The arc discharge manifests itself as a narrow high temperature filament. These filaments are only 10 microns in diameter thus treating a limited amount of the reactants. The treated reactants are heated to temperatures so high that the energy generated by the chemical reaction is miniscule compared to the electrical energy deposited. Attempts to "spread out this" energy to the whole of the fuel air mixture by enhancing the diffusion process, i.e., by introducing turbulence, or by moving the whole arc filament around bodily, e.g., via an applied magnetic field, proved either ineffective or impractical.

The type of plasma that is needed to enhance combustion must be non-thermal, operate at substantially atmospheric pressure, and be generated substantially uniformly over a relatively large volume. Non-Thermal Plasma can produce energetic electrons, typically in the range of approximately 1 eV –10 eV, which effectively leads to the creation of free radicals without adding to the bulk gas the enthalpy necessary to reach very high temperatures as recognized by Penetrante et al., in the publication entitled "Non-Thermal Plasma Techniques for Abatement of Volatile Organic Compounds and Nitrogen Oxides", *INP Report XIII;* B. Müller, Ed., pp. 18–46 (1996) and in the book by Tarnovsky V. and Becker K., *Plasma Sources Science and Technology*, 4, 307 (1995).

It is therefore desirable to put these studies to practical use by developing an efficient and practical self-stabilizing discharge electrode to generate non-thermal plasma for the pre-treatment of combustion air.

SUMMARY OF THE INVENTION

The present invention solves the aforementioned problems by utilizing self-stabilizing discharge electrodes, namely capillary electrodes (as disclosed in U.S. patent application Ser. No. 09/738,923, now U.S. Pat. No. 6,818,193) and slot electrodes (as disclosed in U.S. Provisional Patent Application No. 60/358,340). The present inventive technique is advantageous over the conventional state-of-the-art plasma generation in at least three ways:

(a) increased energy efficiency utilization per unit volume of plasma;

(b) simplified engineering, easily scaleable reactors operating under ambient pressure and temperature; and (c) substantially reduced power to plasma volume ratio leading to a relatively small system footprint.

The invention is directed to an apparatus and method for operating the same for enhancing the combustion process and reducing pollution by-products of combustion using non-thermal atmospheric pressure plasma to pre-treat the combustion air. In particular a capillary electrode or slot electrode configuration may be employed to maintain a sufficient volume of plasma to generate the necessary number of free radicals and distribute them throughout the entire volume of the fuel-air mixture.

An embodiment of the present invention is a device for the pre-treatment of combustion air by exposure to non-thermal plasma at substantially atmospheric pressure. The device includes an inner electrode having a longitudinal channel defined therein to receive a fuel. An outer dielectric layer is separated a predetermined distance from the inner electrode so as to form a non-thermal atmospheric pressure plasma region therebetween for receiving the combustion air to be treated. The outer dielectric has at least one opening (e.g., capillaries or slots) defined therethrough from which the non-thermal plasma is emitted. At least one outer electrode (e.g., in the shape of a pin or ring) is disposed in fluid communication with the at least one opening. The treated combustion air and fuel are combined in a mixing region. The pretreatment device may be disposed in an unsealed or a sealed combustion burner.

The invention also discloses a method for operating the device described above wherein the fluid to be treated (combustion air) is received in the non-thermal atmospheric pressure plasma region in which it is exposed to non-thermal plasma. Fuel is received along a separate path so as not to be subject to non-thermal plasma exposure. The fuel and treated fluid are mixed together in a mixing region prior to passing to a combustion region.

Yet another embodiment of the invention is a device for the pre-treatment of combustion air by exposure to non-thermal plasma at substantially atmospheric pressure, wherein the device has two separate pathways. A first pathway receives the combustion air to be treated. This first pathway is formed or defined by an inner electrode and an outer dielectric layer separated a predetermined distance from the inner electrode so as to form a non-thermal atmospheric pressure plasma region therebetween for receiving the combustion air to be treated. The outer dielectric has at least one opening defined therethrough through which the non-thermal plasma is emitted. In addition the device further includes at least one outer electrode disposed in fluid communication with the at least one opening. A second pathway receives fuel. The second pathway is separate from the first pathway with the two pathways disposed so that respective outputs thereof form a mixing region for receiving the treated combustion air and fuel.

BRIEF DESCRIPTION OF THE DRAWING

The foregoing and other features of the present invention will be more readily apparent from the following detailed description and drawings of illustrative embodiments of the invention wherein like reference numbers refer to similar elements throughout the several views and in which:

FIG. 4b is a cross-sectional view of the burner of FIG. 4a.

DETAILED DESCRIPTION OF THE INVENTION

The segmented electrode capillary discharge, non-thermal plasma reactor in accordance with the present invention is designed so that a fluid being treated, e.g., a gas or a vapor gas mixture, containing one or more chemical agents necessary for combustion (i.e., combustion air, combustible fuel, or some admixture of the two) is subjected to a high density plasma prior to the actual combustion process. The exposure of the fluid to the plasma results in the creation of free radicals that lower the activation energy of combustion and result in lower overall combustion temperature. It is desirable to vary the plasma characteristics so as to be able to specifically tailor chemical reactions to take place by using conditions that effectively initiate or promote desired chemical reactions with minimal, if any, heating of the fluid being treated.

Figure 1:
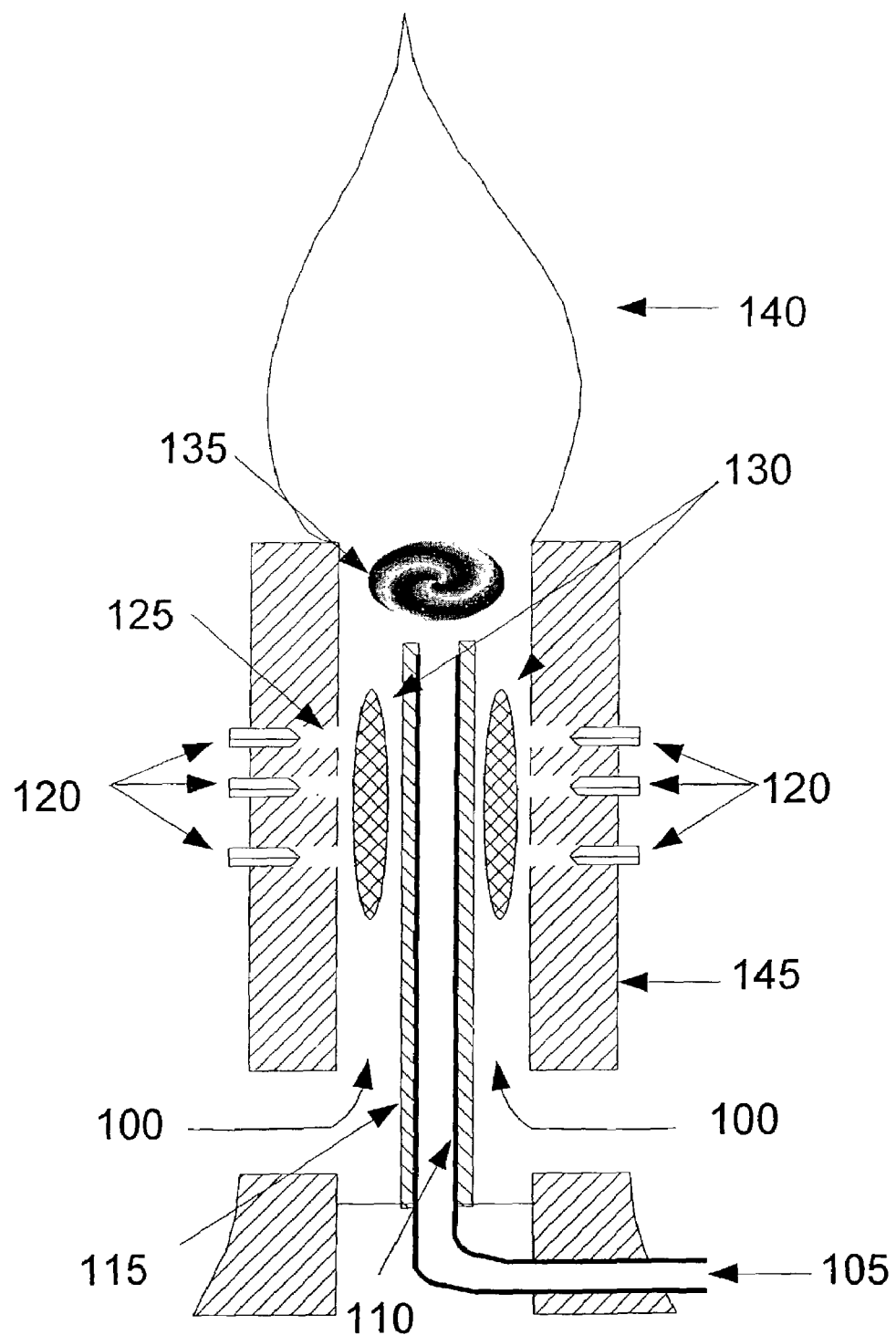
FIG. 1 is a cross-sectional view of a first exemplary burner arrangement in accordance with the present invention.

FIG. 1 is a cross-sectional view of a single exemplary annular, segmented electrode plasma pre-treatment burner system in accordance with the present invention. The system includes a cylindrical hollow outer dielectric layer 145 and a hollow inner electrode 110 disposed therein. In a preferred embodiment, the inner electrode 110 is disposed substantially concentric with the outer dielectric layer 145 and separated by a predetermined distance to form a non-thermal atmospheric plasma region 130 therebetween. A combustion air inlet port 100 is in fluid communication with non-thermal atmospheric pressure plasma region 130. Inner electrode 110 has a channel defined therethrough so as to permit the passage of fuel received through a fuel inlet port 105 without being exposed to plasma. Any combustible material in either a liquid or gaseous state may be used as a fuel source. Inner electrode 110 is preferably encased in a dielectric coating or layer 115. A plurality of capillaries 125 are preferably defined radially outward in the outer dielectric layer 145. Embedded partially in each capillary is a segmented electrode pin 120.

In operation, combustion air to be treated is received in the combustion air inlet port 100 and enters the non-thermal atmospheric pressure plasma region 130 where it is subject to non-thermal plasma emitted from the capillaries 125 upon applying a voltage differential between the inner electrode 110 and segmented pin electrodes 120. The treated combustion air advances through the non-thermal atmospheric pressure plasma region 130 and mixes with fuel received through the hollow channel of the inner electrode 110 in a mixing region 135. In a preferred embodiment the mixing region 135 is disposed inside the outer dielectric 145 but above the inner electrode 110, which does not extend the entire length of the outer dielectric 145. Finally, the mixture exits from the outer dielectric 145 and enters a combustion region 140.

Figure 2A:
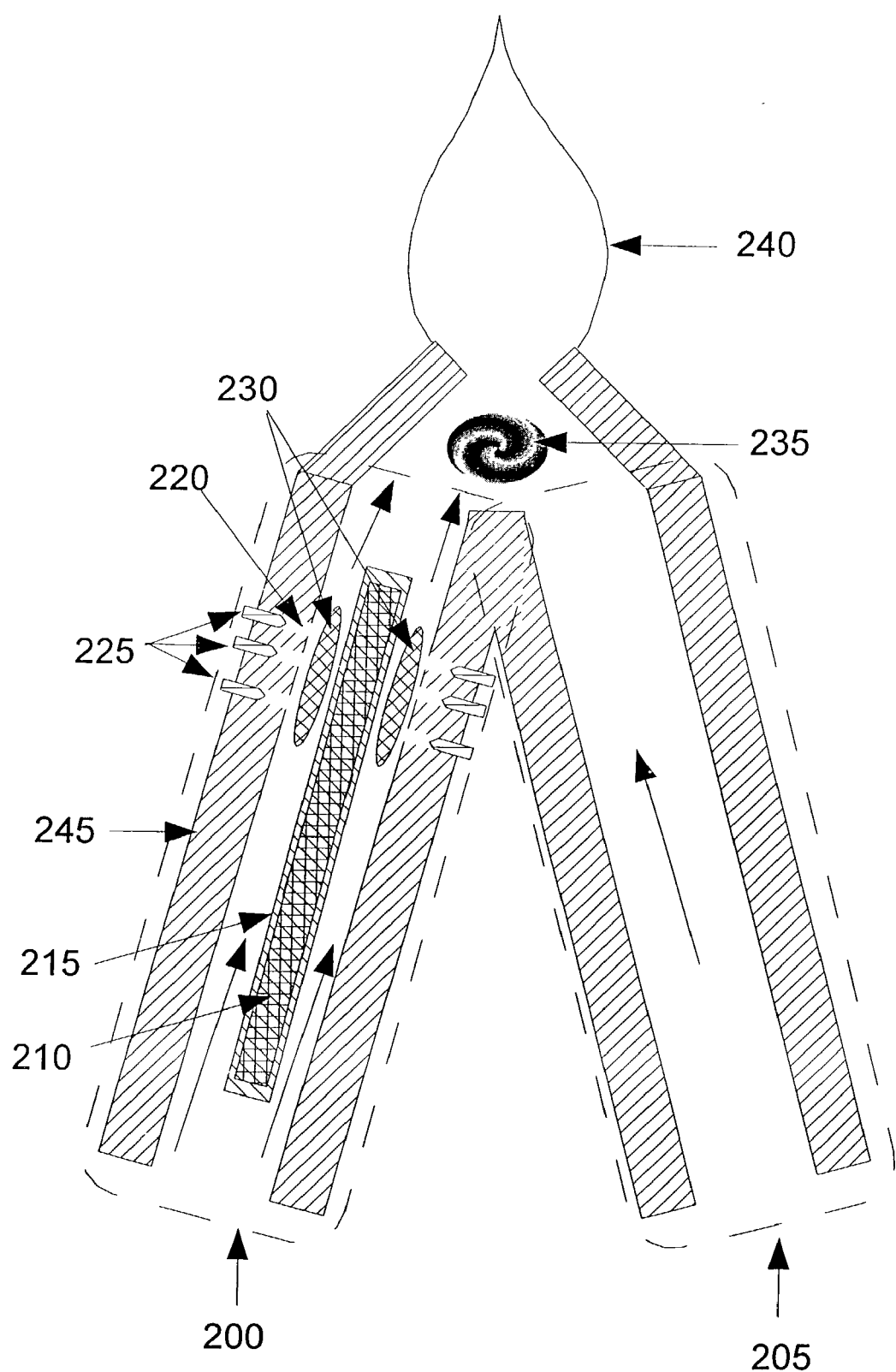
FIG. 2a is a cross-sectional view of a second exemplary burner arrangement in accordance with the present invention.

A cross-sectional view of a second embodiment of a single annular capillary electrode plasma pre-treatment burner system in accordance with the present invention is shown in FIG. 2a. In contrast to the single pathway in the first embodiment (FIG. 1), two distinct and physically separated pathways are provided for air and fuel flow in the second embodiment (FIG. 2a). Combustion air flows through combustion air pre-treatment unit 200 for plasma treatment prior to mixing with the fuel flowing through fuel port 205. The combustion air pre-treatment unit 200 includes a solid inner electrode 210, which preferably has a dielectric outer coating 215. Once again, a plurality of capillaries 220 are preferably defined radially outward through an outer dielectric 245, some or all of the capillaries 220 may have an electrode pin 225 embedded therein.

During operation, combustion air flows through the passageway or non-thermal atmospheric pressure plasma region 230 defined between the outer dielectric 245 and the inner electrode 210. Within the non-thermal atmospheric pressure plasma region 230, the combustion air is subject to non-thermal plasma emitted from the capillaries 220. The combustion air after having been treated by the plasma mixes with the fuel from the fuel port 205 in a mixing region 235 and then the mixture proceeds to a combustion region 240.

Figure 2B:
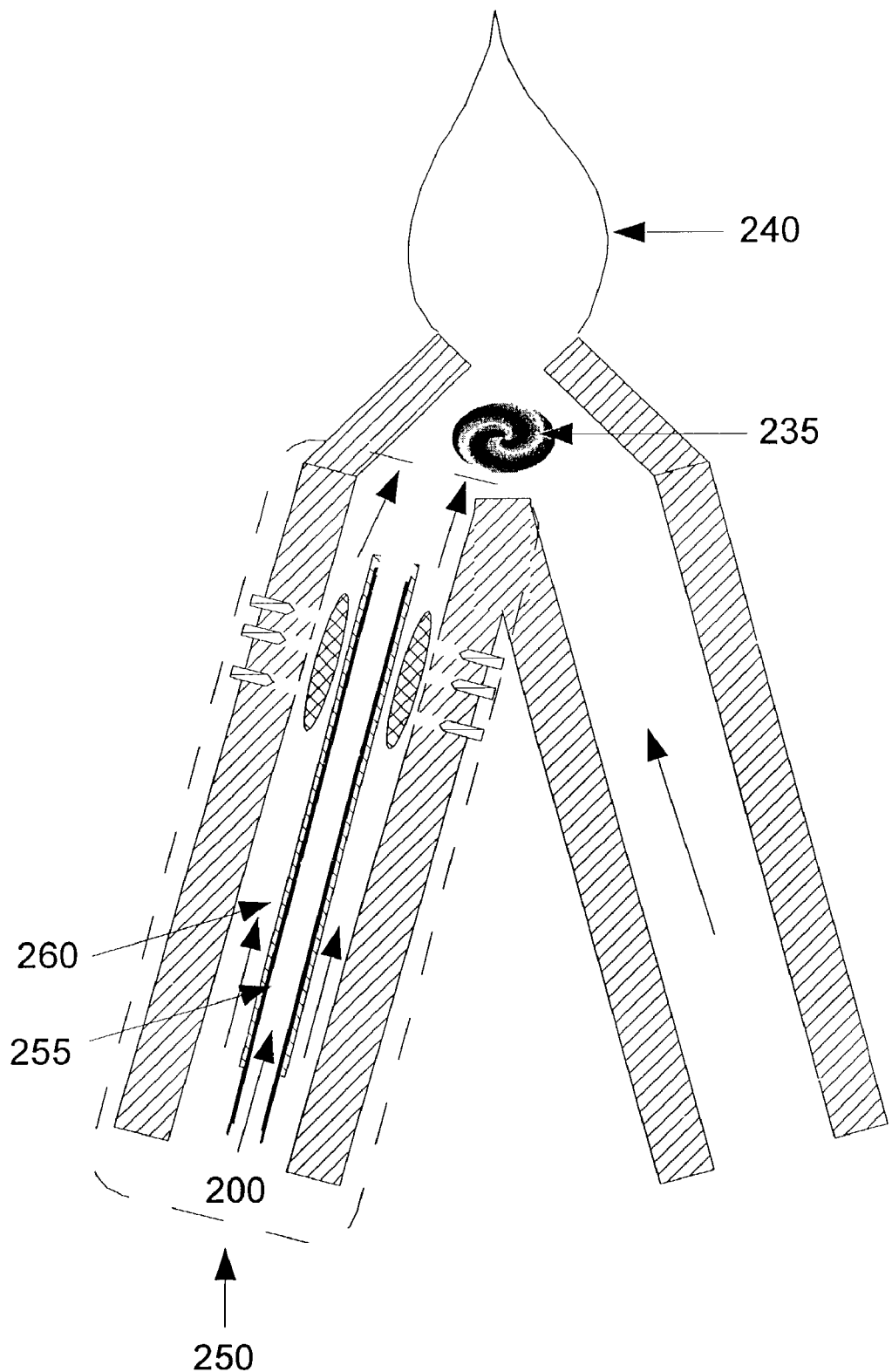
FIG. 2b is a cross-sectional view of a third exemplary burner arrangement embodiment wherein the solid inner electrode is replaced with a hollow inner electrode, which provides another path to the mixing region that bypasses the plasma treatment region.

FIG. 2b is a variation of the embodiment shown in FIG. 2a. The combustion air treatment unit 250 in the embodiment shown in FIG. 2b employs a hollow (as opposed to a solid) inner electrode 255, which is preferably coated with a dielectric layer 260. Electrically this electrode behaves identically to the solid, inner electrode 210 shown in FIG. 2a. The hollow channel of the inner electrode 255 serves as an additive port 265 for introducing another substance, e.g., non-treated air or fuel additive, into the mixing region 235, thereby circumventing the non-thermal atmospheric pressure plasma region 230 and preventing mixing of the fuel until reaching the mixing region 235.

Figure 3:
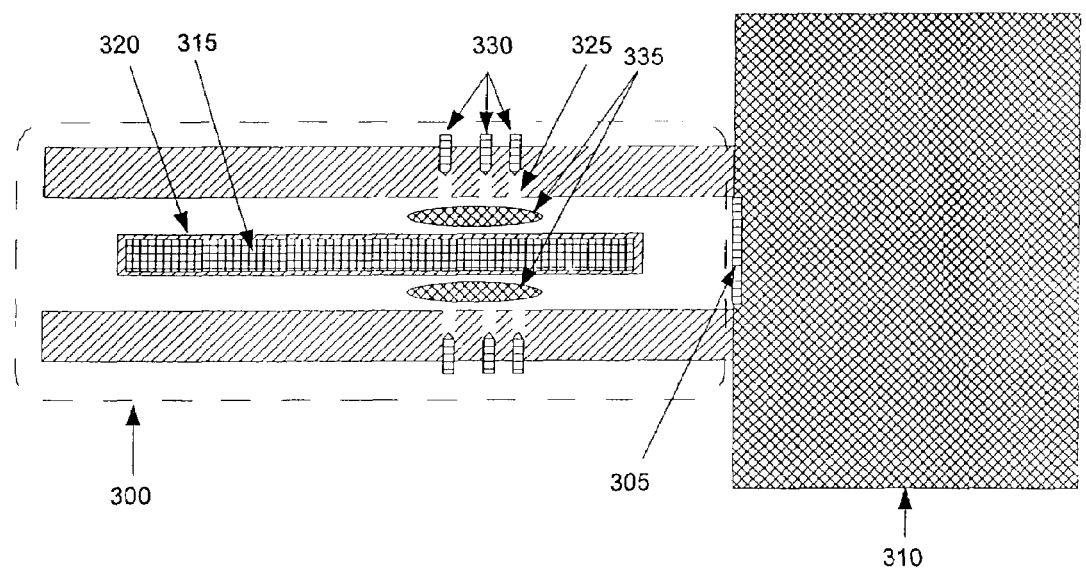
FIG. 3 is a cross-sectional view showing the placement of a Segmented Electrode Capillary Discharge system in accordance with the present invention into the air intake of an internal combustion chamber.

The aforementioned embodiments in FIGS. 1, 2a and 2b show an exemplary plasma pre-treatment unit in accordance with the present invention for use in a non-sealed burner arrangement. FIG. 3 shows an exemplary plasma pre-treatment unit 300 that may be used, for example, in a sealed burner arrangement like that which may be found on a boiler or employed with an internal combustion chamber such as the cylinder of a car engine. The pre-treatment unit may use a fuel in a solid, liquid, gaseous, or any combination of states thereof. In addition, the device may treat a gaseous fuel-air combination prior to entering the combustion chamber.

The plasma pre-treatment unit 300 is arranged upstream of the an air intake 305 of a sealed burner/internal combustion chamber represented generically by the box identified as reference element number 310. Plasma pre-treatment unit 300 is similar to the combustion air treatment unit 200 of FIG. 2a. Specifically, plasma pre-treatment unit 300 includes an inner electrode 315, which is shown in FIG. 3 as being solid but may alternatively have a channel defined therethrough. If a hollow inner electrode is used another chemical additive may be introduced therethrough thereby bypassing the non-thermal atmospheric pressure plasma region 335 and mixing only with the plasma treated air. Preferably, inner electrode 315 has a dielectric coating or layer 320. A plurality of electrode pins 330 are partially embedded in respective capillaries defined radially outward through outer dielectric 340. Combustion air flows through the non-thermal atmospheric pressure plasma region 335 defined between the inner electrode 315 and the outer dielectric 340 and is subject to the non-thermal plasma emitted from the capillaries 325. The plasma treated air, which may or may not be mixed with an additive, then proceeds through the air intake 305 into the sealed burner/ internal combustion chamber 310.

In all of the heretofore described and illustrated pre-treatment unit embodiments described above the non-thermal plasma is generated using an exemplary segmented capillary discharge configuration wherein the electrodes are pins embedded partially into respective capillaries defined radially therethrough the outer dielectric. Alternatively, the electrode pins may be substantially flush with the outer perimeter of the outer dielectric. In addition, the capillaries need not be defined radially therethrough the outer dielectric but instead may be arranged at any desired angle. Furthermore, the shape of the electrode may be modified to be a ring or disk disposed proximate or in contact with the entrance to the capillary. Any geometric configuration of the electrode is contemplated and within the scope of the invention so long as it is in fluid communication with an associated capillary. Alternative configurations, although not exhaustive, are shown and described in U.S. patent application Ser. No. 09/738,923 now U.S. Pat. No. 6,818,913. The density (number), size and/or spacing of the capillary holes 125 can be varied to tailor the physical properties of the plasma such as, but not limited to volume, ion density, and/or electron density.

Figure 4A:
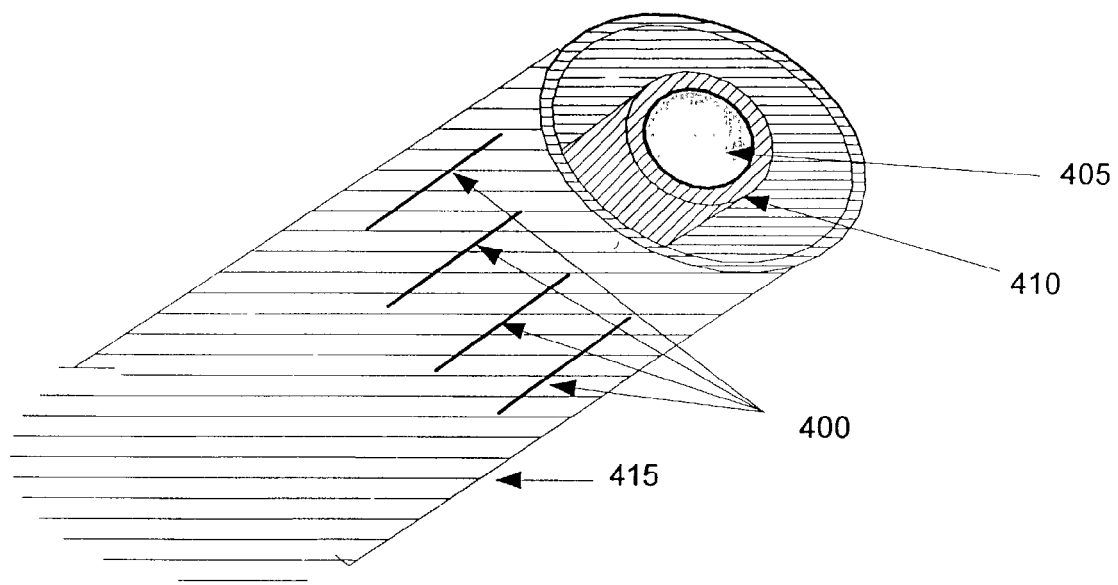
FIG. 4a is a perspective view of a section of a cylindrically shaped burner in accordance with the present invention having a slot electrode discharge plasma generation configuration.

Other alternative configurations are contemplated and within the intended scope of the invention. FIG. 4a is a perspective view of yet another embodiment of a plasma treatment unit in accordance with the present invention in which the non-thermal plasma is generated using a slot electrode discharge configuration, as disclosed in U.S. Provisional Patent Application No. 60/358,340. In particular, the slot electrode discharge configuration includes an inner electrode 405, which may be hollow or solid, and is preferably coated with a dielectric layer or coating 410. An outer dielectric 415 is disposed preferably concentrically about and separated a predetermined distance from the inner electrode 405 to form a non-thermal atmospheric pressure plasma region 420 therebetween. A plurality of slots 400 are defined in the outer dielectric 415 to form a slot electrode discharge. As shown in FIG. 4a, the slots 400 are arranged in a longitudinal direction. Alternatively, the slots may be arranged, for example, substantially perpendicular to the longitudinal axis or spirally. A power supply (not shown) is connected between the inner electrode 405 and the slot electrode. An electrode is embedded in or proximate to the respective slots 400. For example, an electrode in the shape of a tapered blade that is partially inserted or proximate a respective slot. This also could take the form of a wire arranged in a longitudinal direction substantially parallel to the length of the slot and embedded in or proximate to the slot.

Figure 4B:
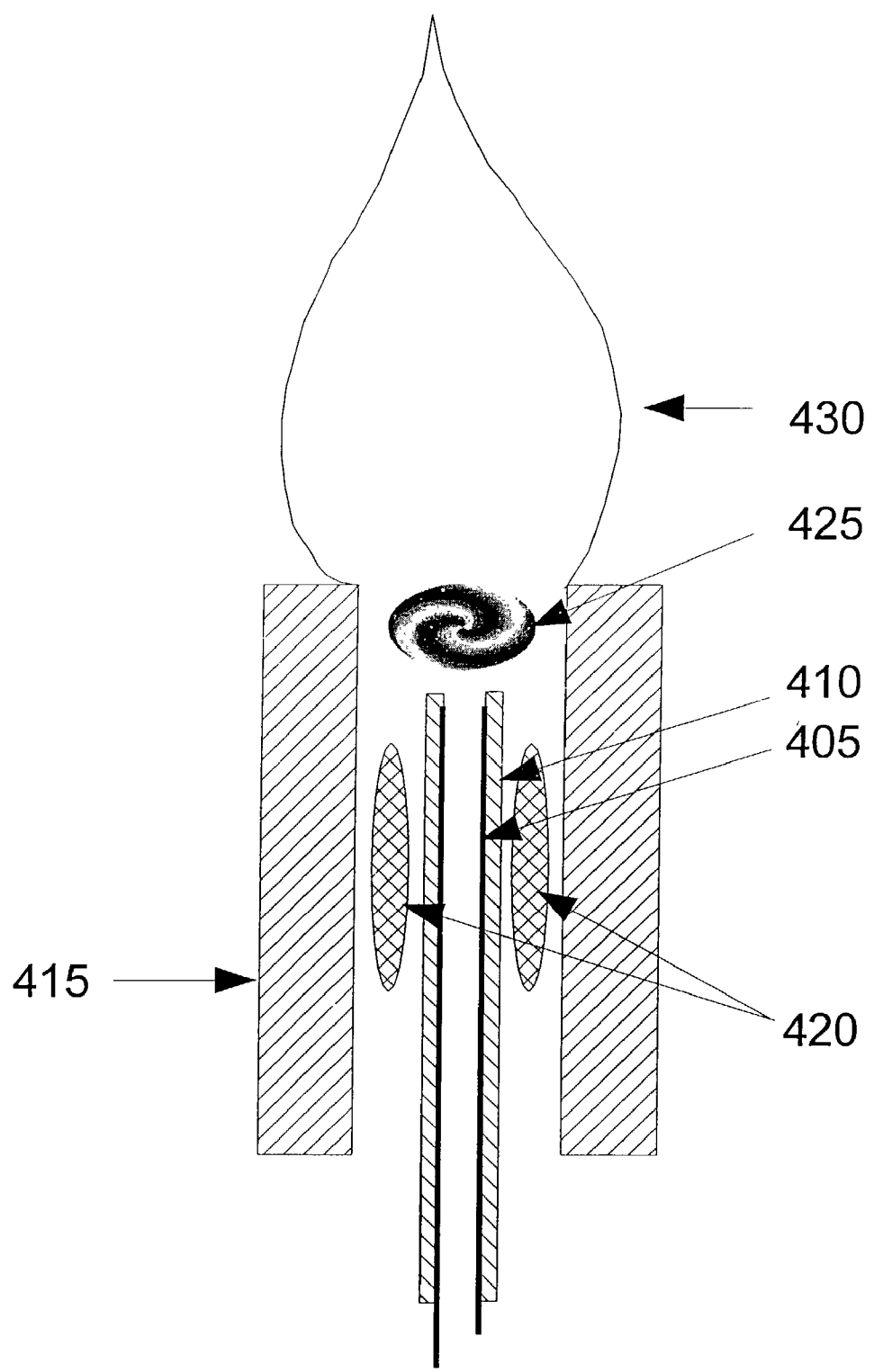

FIG. 4b is a cross-sectional view of the plasma treatment unit of FIG. 4a employed in an open burner arrangement similar to the one shown in FIG. 1. The combustion air flows through and is treated in the non-thermal plasma region 420 between the outer dielectric 415 and the inner electrode 405 (which is hollow in this example) by the non-thermal plasma emitted from the slots 400. The treated combustion air then enters the mixing region 425 where it mixes with fuel flowing through the hollow channel extending through the inner electrode 405. Thereafter, the mixture enters the combustion region 430.

The plasma treatment units shown and described above all have an annular shape configuration. It is to be understood that the size and shape of the plasma treatment and, in particular, to the size and shape of the inner and outer electrodes and dielectrics need not necessarily be annular. Any shaped geometry may be used, as desired.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

Every issued patent, pending patent application, publication, journal article, book or any other reference cited herein is each incorporated by reference in their entirety.

What is claimed is:

1. A device for the pre-treatment of combustion air by exposure to non-thermal plasma at substantially atmospheric pressure, the device comprising:
   an inner electrode having a longitudinal channel defined therein to receive a fuel;
   an outer dielectric separated a predetermined distance from the inner electrode so as to form a non-thermal atmospheric pressure plasma region therebetween for receiving the combustion air to be treated, the outer dielectric having at least one opening defined therethrough through which the non-thermal plasma is emitted;
   at least one outer electrode disposed in fluid communication with the at least one opening; and
   a mixing region for receiving the treated combustion air and fuel.

2. The device in accordance with claim 1, further comprising an inner dielectric coating disposed about the inner electrode.

3. The device in accordance with claim 1, wherein the outer dielectric extends beyond the inner electrode in a longitudinal direction.

4. The device in accordance with claim 1, wherein the opening is a capillary.

5. The device in accordance with claim 4, wherein the outer electrode is in the shape of a pin or ring.

6. The device in accordance with claim 1, wherein the opening is a slot.

7. The device in accordance with claim 6, wherein the slot is arranged in a longitudinal direction, a spiral direction, or a direction substantially perpendicular to a longitudinal axis.

8. The device in accordance with claim 6, wherein the outer electrode is in the shape of a tapered blade or wire disposed substantially parallel to the slot.

9. The device in accordance with claim 1, wherein the outer electrode is disposed so as to be partially inserted, embedded, or proximate the opening.

10. A device for the pre-treatment of combustion air by exposure to non-thermal plasma at substantially atmospheric pressure, the device comprising:
    a first pathway for receiving the combustion air to be treated, the first pathway being formed by:
       an inner electrode;
       an outer dielectric separated a predetermined distance from the inner electrode so as to form a non-thermal atmospheric pressure plasma region therebetween for receiving the combustion air to be treated, the outer dielectric having at least one opening defined therethrough through which the non-thermal plasma is emitted;
    at least one outer electrode disposed in fluid communication with the at least one opening; and
    a second pathway for receiving fuel, the second pathway being separate from the first pathway, the first and second pathways being disposed so that respective outputs thereof form a mixing region for receiving the treated combustion air and fuel.

11. The device in accordance with claim 10, wherein the inner electrode is solid.

12. The device in accordance with claim 10, wherein the inner electrode has a channel defined longitudinally therein.

13. The device in accordance with claim 10, wherein the opening is a capillary.

14. The device in accordance with claim 13, wherein the outer electrode is in the shape of a pin or ring.

15. The device in accordance with claim 10, wherein the opening is a slot.

16. The device in accordance with claim 15, wherein the slot is arranged in a longitudinal direction, a spiral direction, or a direction substantially perpendicular to a longitudinal axis.

17. The device in accordance with claim 15, wherein the outer electrode is in the shape of a tapered blade or wire disposed substantially parallel to the slot.

18. The device in accordance with claim 10, wherein the outer electrode is disposed so as to be partially inserted, embedded, or proximate the opening.

19. A method for operating a device for the pre-treatment of combustion air by exposure to non-thermal plasma at substantially atmospheric pressure, the device including an inner electrode, an outer dielectric separated a predetermined distance from the inner electrode so as to form a non-thermal atmospheric pressure plasma region therebetween, the outer dielectric having at least one opening defined therethrough through which the non-thermal plasma is emitted, and at least one outer electrode disposed in fluid communication with the at least one opening, the method comprising the steps of:
    receiving the combustion air into the non-thermal atmospheric pressure plasma region;
    treating the combustion air with non-thermal plasma emitted into the non-thermal atmospheric pressure plasma region;
    receiving fuel along a path so as not to be subject to non-thermal plasma exposure; and
    mixing the treated combustion air and the fuel in a mixing region.

20. The method in accordance with claim 19, wherein said receiving fuel step further comprises passing the fuel through a channel defined longitudinally in the inner electrode.

21. The method in accordance with claim 19, wherein the step of receiving the combustion air comprises passage of the combustion air along a first pathway defined by the inner electrode and outer dielectric.

22. The method in accordance with claim 21, wherein the step of receiving the fuel comprises passing the fuel along a second pathway separate from the first pathway, the pathways being arranged so that respective outputs thereof form the mixing region.

23. The method in accordance with claim 19, wherein the device further comprises an inner dielectric coating disposed about the inner electrode.

24. The method in accordance with claim 19, wherein the outer dielectric extends beyond the inner electrode in a longitudinal direction.

25. The method in accordance with claim 19, wherein the opening is a capillary.

26. The method in accordance with claim 25, wherein the outer electrode is in the shape of a pin or ring.

27. The method in accordance with claim 19, wherein the opening is a slot.

28. The method in accordance with claim 27, wherein the slot is arranged in a longitudinal direction, a spiral direction, or a direction substantially perpendicular to a longitudinal axis.

29. The method in accordance with claim 27, wherein the outer electrode is in the shape of a tapered blade or wire disposed substantially parallel to the slot.

30. The method in accordance with claim 19, wherein the outer electrode is disposed so as to be partially inserted, embedded, or proximate the opening.

31. A system comprising:
a sealed combustion chamber having an air intake;
a plasma pre-treatment unit connected to the air intake, the plasma pre-treatment unit configured to expose the combustion air to be treated to non-thermal plasma at substantially atmospheric pressure, the plasma pre-treatment unit comprising:
an inner electrode;
an outer dielectric separated a predetermined distance from the inner electrode configured to form a non-thermal atmospheric pressure plasma region therebetween which surrounds the inner electrode, the outer dielectric having at least one opening defined substantially laterally therethrough through which the non-thermal plasma is emitted; and
at least one outer electrode disposed in fluid communication with the at least one opening.

32. The system in accordance with claim 31, wherein the sealed combustion chamber is one of a sealed burner or an internal combustion chamber.

33. The system in accordance with claim 31, further comprising an inner dielectric coating disposed about the inner electrode.

34. The system in accordance with claim 31, wherein the outer dielectric extends beyond the inner electrode in a longitudinal direction.

35. The system in accordance with claim 31, wherein the opening is a capillary.

36. The system in accordance with claim 35, wherein the outer electrode is in the shape of a pin or ring.

37. The system in accordance with claim 31, wherein the opening is a slot.

38. The system in accordance with claim 37, wherein the slot is arranged in a longitudinal direction, a spiral direction, or a direction substantially perpendicular to a longitudinal axis.

39. The system in accordance with claim 37, wherein the outer electrode is in the shape of a tapered blade or wire disposed substantially parallel to the slot.

40. The system in accordance with claim 31, wherein the outer electrode is disposed so as to be partially inserted, embedded, or proximate the opening.

41. A system comprising:
a sealed combustion chamber having an air intake;
a plasma pre-treatment unit connected to the air intake, the plasma pre-treatment unit configured to expose the combustion air to be treated to non-thermal plasma at substantially atmospheric pressure, the plasma pre-treatment unit comprising:
an inner electrode;
an outer dielectric separated a predetermined distance from the inner electrode configured to form a non-thermal atmospheric pressure plasma region therebetween which surrounds the inner electrode, the outer dielectric having a primary opening defined along a longitudinal axis and at least one secondary opening through which the non-thermal plasma is emitted, the secondary opening having an axis passing therethrough which intersects the longitudinal axis and which is in fluid communication with the non-thermal atmospheric pressure plasma region; and
at least one outer electrode disposed in fluid communication with the at least one secondary opening.

42. The system of claim 41, wherein the axis passing through the secondary opening is substantially perpendicular to the longitudinal axis.

* * * * *